United States Patent [19]

Cunningham

[11] 4,249,867
[45] Feb. 10, 1981

[54] WINDMILL HAVING COUNTERBALANCING MECHANISM

[75] Inventor: Donald F. Cunningham, Carefree, Ariz.

[73] Assignee: Springhurst Technologies Corp., Bedford Hills, N.Y.

[21] Appl. No.: 38,637

[22] Filed: May 14, 1979

[51] Int. Cl.³ .............................................. F04B 17/02
[52] U.S. Cl. ...................................... 417/334; 74/590
[58] Field of Search .......................... 417/35, 334, 545; 74/590

[56] References Cited

U.S. PATENT DOCUMENTS

| 455,255 | 6/1891 | Konoyer | 74/590 |
|---|---|---|---|
| 716,786 | 12/1902 | Terry | 74/590 |
| 817,794 | 4/1906 | McKay | 74/590 |
| 914,385 | 3/1909 | Cotten | 74/590 |
| 1,019,142 | 5/1912 | Engle | 74/590 |
| 1,632,322 | 6/1927 | Stripling | 74/590 |
| 2,460,527 | 1/1949 | Oliveros | 417/35 |
| 3,782,222 | 1/1974 | Berggren | 74/590 |

FOREIGN PATENT DOCUMENTS 25896  3/1930  Australia ................................... 74/590

Primary Examiner—William L. Freeh
Attorney, Agent, or Firm—Kane, Dalsimer, Kane, Sullivan and Kurucz

[57] ABSTRACT

A windmill is disclosed having a counterbalancing mechanism which allows it to pump effectively under minimal wind velocity. The windmill includes blades which undergo rotational movement when actuated by the wind, a transmission for converting rotational movement of the blades to reciprocal motion of a pumping rod, a support structure or tower for supporting the blades, transmission, and rod, a counterbalancing mechanism functionally connected to the support structure and rod such that the weight of the rod and liquid column within the well is effectively counterbalanced, and a collar surrounding the rod and supported by the support structure to prevent vibration of the rod during reciprocation. The counterbalancing mechanism may include a pair of rods which are pivotably supported on the supporting structure of the windmill and pivotably mounted to the pumping rod. Weights are attached to the portions of the rods extending exteriorly from the supporting structure. The weights are appropriately positioned with respect to the pivot on the support structure to counterbalance the weight of the pumping rod and liquid column.

14 Claims, 8 Drawing Figures

WINDMILL HAVING COUNTERBALANCING MECHANISM

BACKGROUND OF THE INVENTION

The field of the invention relates to windmills having counterbalancing mechanisms for allowing effective operation under minimal wind velocities.

Windmills have for many years been used for pumping water to supply the needs of rural residents, farmers and communities where surface water is not readily accessible. Their advantages are their simplicity in construction and economical operation.

The disadvantages of commercially available windmills have been their unreliability (due to dependence on a considerable gust of wind to start vane rotation) and the limited depth from which they could pump. The latter problem is particularly serious in areas where the water table is deep or has dropped considerably over a period of years. For these reasons, many users have turned to diesel, gas or electrically powered pumps to provide water for domestic and livestock consumption or irrigation.

In addition to the relatively high initial expenditures for pumps of this type, their cost of operation has increased dramatically over the past few years due to rising energy costs. They are also infeasible in parts of the world where power is unavailable and where the technical expertise for maintaining or operating the pumps is absent.

Attempts have been made to provide a windmill which will be actuated without the need of a sizable gust of wind. U.S. Pat. No. 3,782,222 is an example of a windmill having a counterbalancing system. Other pumping devices, such as disclosed in U.S. Pat. Nos. 1,019,142 and 1,632,322 have also employed counterweights in various manners.

SUMMARY OF THE INVENTION

It is an important object of the invention to provide a counterbalanced windmill which (1) operates effectively under minimal wind conditions; (2) is simple in operation so as to avoid malfunction; (3) pumps water or oil from considerable depths; and (4) has a simple construction allowing easy repairs even in remote or undeveloped areas throughout the world.

A windmill is accordingly provided which includes a supporting tower, a plurality of blades rotatably supported at the top of the tower, transmission means for converting the rotational movement of the blades into reciprocal motion of a pumping rod which is conn-nected in turn to a positive displacement type pump at the bottom of a well, and counterbalancing means for counterbalancing the weight of the pumping rod and the liquid column to the bottom of the well.

In a preferred embodiment of the invention, a particular counterbalancing means is utilized to advantage. A first support member is rigidly attached to the pumping rod so that it will travel up and down with the rod as it reciprocates. A pair of bearings are provided, one within a hollow core in each half of the first support member. First and second pivotable members are attached to the first support member by means of portions which are journalled or otherwise supported within the respective hollow cores. These pivotable members are capable of rotation with respect to the first support member. The portions of the pivotable members extending from the hollow cores are provided with bores extending therethrough.

First and second rods extend through the bores in the respective pivotable members to third and fourth pivotable members which are secured to the windmill tower. As the pumping rod moves up and down, the first and second rods are able to slide within the bores of the first and second pivotable members. The third and fourth pivotable members are preferably mounted to horizontal support beams of the windmill tower by means of bearings.

Third and fourth rods having counterbalancing weights attached thereto extend outwardly from the third and fourth pivotable members, respectively. These rods and weights are appropriately positioned such tht when the pumping rod is halted at any position of its stroke, the weights are in a position to substantially counterbalance the forces which would tend to cause the pumping rod to move to its lowest position. This rod may accordingly be raised with only a minimal upward force thereon.

In another possible embodiment, the pivoting means may be eliminated from the first support member attached to the first and second rods. These rods have one end pivotably secured to the windmill tower as described above, but the other end is simply connected to the first support member by means of a flexible cable or chain. As in the above case, third and fourth rods having counterbalancing weights attached thereto are pivotably secured to the tower so that the weight of the pumping rod and liquid column is counterbalanced.

A sleeve or collar for preventing the pumping rod from undesired lateral movement may also be provided. Such movement could adversely affect the system's smooth operation and cause unnecessary wear on the bearings. It may either be rigidly secured to the tower so that the rod moves within it, or be fixedly secured to the rod and attached to the tower by means of telescoped members pivotably secured thereto. In the latter system, the telescoped members move with the pumping rod as it reciprocates to provide the desired lateral stability.

DESCRIPTION OF THE INVENTION

Figure 1:
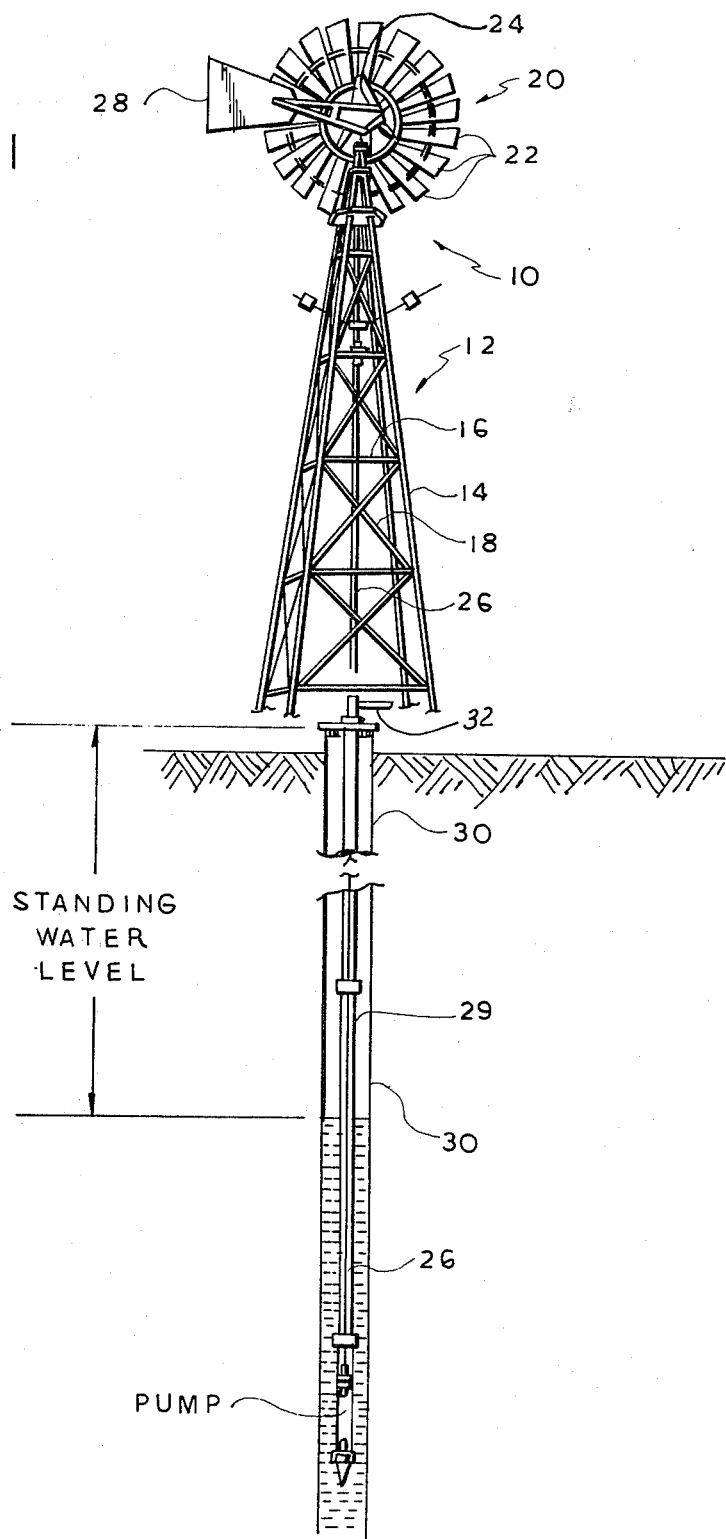
FIG. 1 is a perspective view of a windmill and well.

FIG. 1 is illustrative of the invention which allows water to be pumped from far greater depths than presently available windmills and which operates in significantly less wind. Presently available windmills have difficulty pumping effectively below a depth of two hundred feet without unusually high winds, whereas the present apparatus allows pumping from a thousand feet or more in light winds which are available most of the time.

The windmill 10 includes a tower 12 having vertically inclined 14, horizontal 16, and diagonal 18 supporting beams. The tower of a typical installation may be about forty feet in height and supports a twelve foot diameter rotor 20 at its top having eighteen blades 22 for catching the wind. The rotor 20 is mounted on a gearing mechanism 24 which converts rotational movement of the rotor into reciprocal motion of a pumping rod 26 operatively connected thereto.

The rotor and gearing mechanism 24 are rotatably mounted upon the tower to permit the rotor to turn into the wind. A large vane 28 is provided for directing the rotor. Means are often provided for turning the rotor away from the wind under potentially damaging wind conditions.

The pumping rod 26 extends within the casing 29 within shaft 30 of a well. The gearing mechanism may be adapted for providing about a twelve inch stroke of the pumping rod. Depending on the well's casing size and pump cylinder diameter about half a gallon of water can be pumped per stroke. Water is pumped from the shaft into pipe 32 from where it may be stored or utilized by the user or community.

Figure 2:
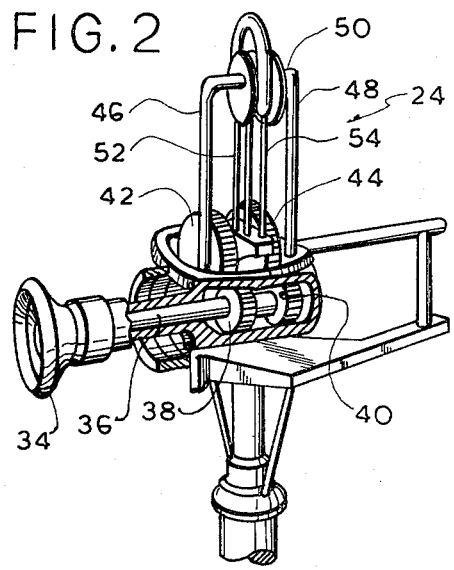
FIG. 2 is a perspective view of a gearing mechanism for converting the rotational movement of the blades into reciprocal motion of a pumping rod.

The gearing mechanism 24 shown in FIG. 2 is adapted for causing the reciprocal motion of the pumping rod 26. It includes a hub 34 for attachment of the rotor 20. The hub is connected to an axle 36 which rotates a first pair of gears 38, 40. Rotation of these gears 38, 40 in turn results in the rotation of a second pair of gears 42, 44 which are intermeshed with the first pair. A pair of arms 46, 48 are at one end rotatably secured to the second pair of gears and at the other end secured to a horizontal shaft 50. Since the arms are connected at positions which are off-center to gears 42, 44, rotation of these gears causes the reciprocal motion of the arms 46, 48 and shaft 50. The movement of the shaft 50 is guided by a pair of vertical guiding arms 52, 54. The pumping rod 26 is operatively connected to the shaft 50 and reciprocates therewith.

Figure 3:
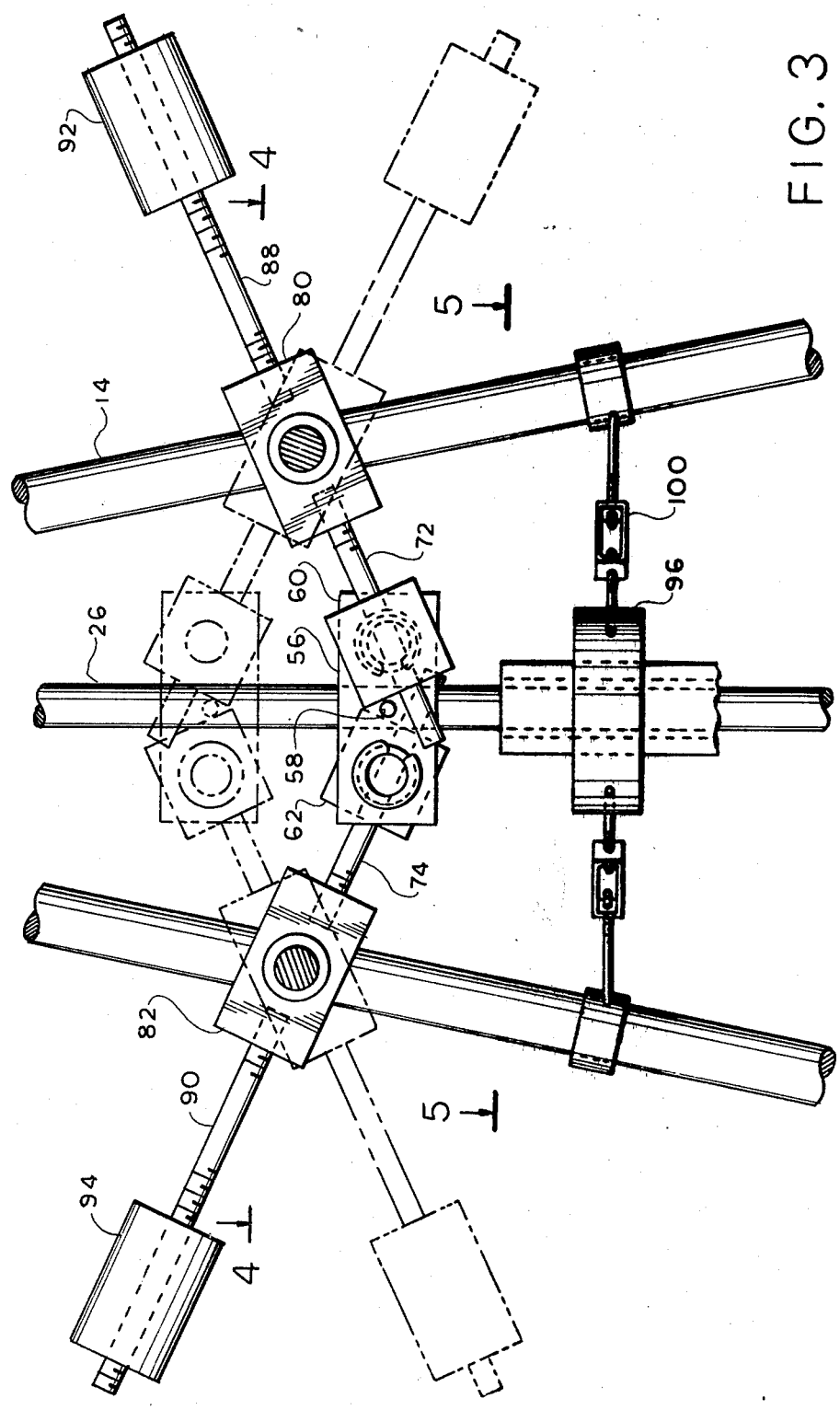
FIG. 3 is a side elevation view of a counterbalancing mechanism utilized to counterbalance the pumping rod and liquid column.
Figure 4:
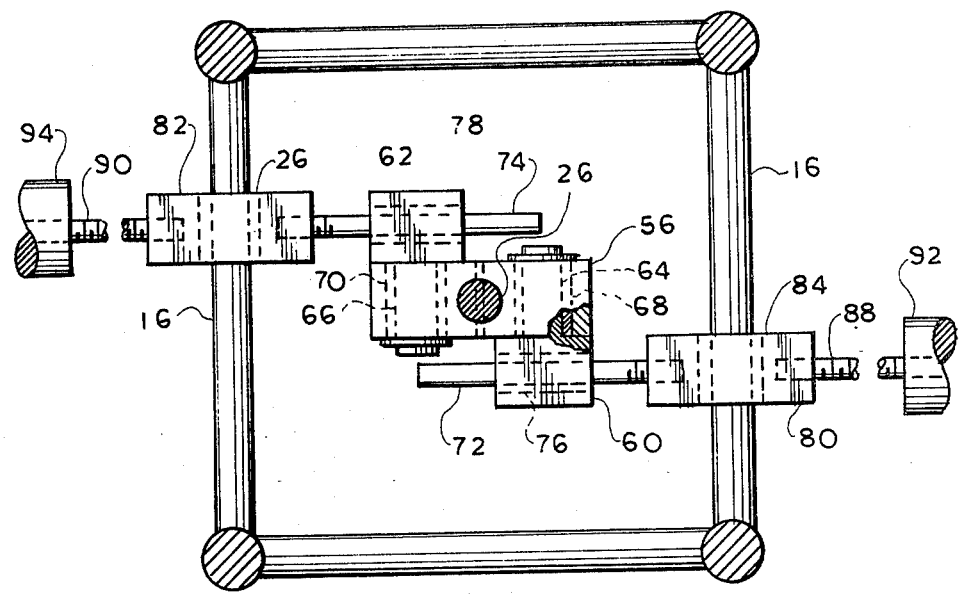
FIG. 4 is a partially sectional view taken along a plane of line 4—4 of FIG. 3.

A counterbalancing system is provided to allow the windmill to pump at virtually all times and with minimal strain upon the gearing mechanism 24 due to the elimination of the static load of the pumping rod and liquid column on the mechanism. The gearing mechanism will therefore require less maintenance and have an increased useable life. A particularly advantageous system is illustrated in FIGS. 3 and 4.

A first support member 56 is fixedly secured to the pumping rod 26 by a pin 58 or other suitable means. A pair of hollow cores are provided in the support member 56. First and second pivotable members 60, 62 are positioned on opposite sides of the support member 56. Each of these members has cylindrical extending portions 64, 66 positioned within the respective cores in the support member. Bearings 68, 70 are provided between these portions 64, 66 and the walls defining the cores so that the pivotable members 60, 62 may rotate freely about the axes of the cores. Each of the pivotable members 60, 62 also includes a bore which is substantially perpendicular to the axis of its cylindrical extending portion. The bores are adapted for receiving first and second rods 72, 74 which are easily slidable therein due to the provision of bearings 76, 78. One end of each of the rods is rigidly secured to third and fourth pivotable members 80, 82, respectively.

Each of the pivotable members 80, 82 is attached to a horizontal beam 16 of the tower 12. The beam has a circular cross section so that the pivotable members 80, 82 secured thereto can rotate freely. Bearings 84, 86 are provided to facilitate this rotation.

A second set of rods 88, 90 extend from the respective opposite sides of the third and fourth pivotable members 80, 82 from where rods 72, 74 extend. Although shown in the drawings as parallel to rods 72, 74, it is not essential that rods 88, 90 be arranged in precisely this manner.

Figure 8:
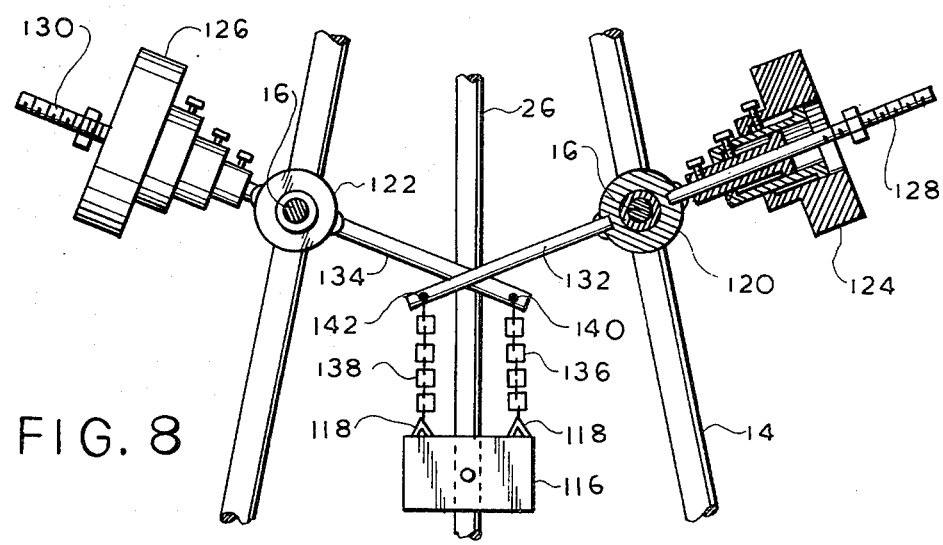
FIG. 8 is a side elevation view showing an alternative counterbalancing mechanism.

Weights 92, 94 are attached to the rods 88, 90 at appropriate distances from the axes of rotation of the third and fourth pivotable members to effectively counterbalance the weight of the pumping rod 26 and liquid column. Threads as shown in FIG. 3 may be provided on the rods 88, 90 for enabling one to position the weights where desired. Alternatively, the weights may be arranged in a telescoped configuration for purposes of adjustment. FIG. 8 illustrates such an arrangement.

Figure 5:
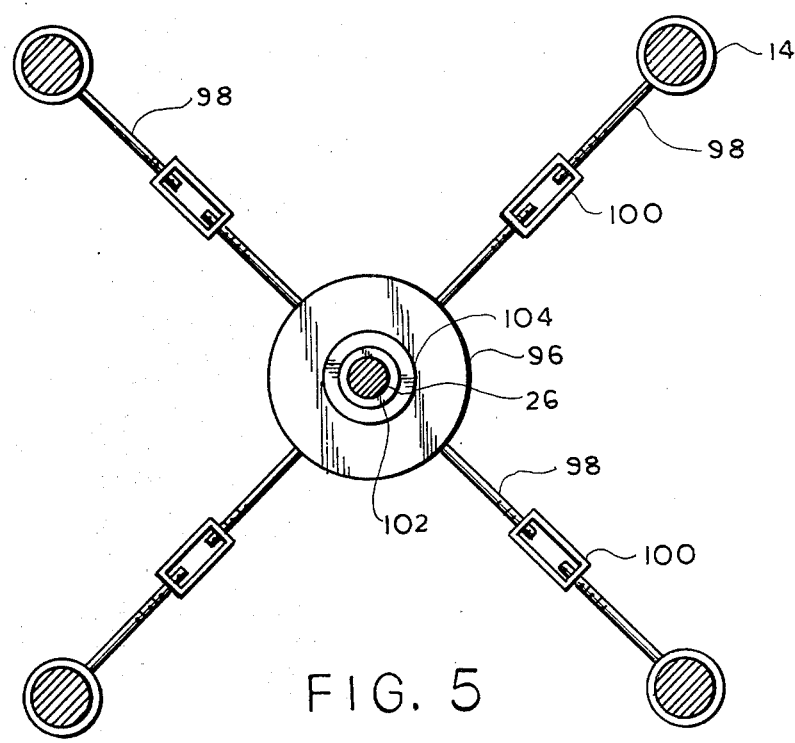
FIG. 5 is a partially sectional view taken along a plane of line 5—5 of FIG. 3.

Means are also provided for guiding the pumping rod 26 as it reciprocates. As shown in FIG. 5, a collar 96 is secured to the supporting beams 14 of the tower. Threaded rods 98 and turnbuckles 100 can be employed to center the collar so the pumping rod passes through its hollow core 102. A bearing 104 may be utilized to minimize friction if the pumping rod contacts the walls of the collar.

Figure 6:
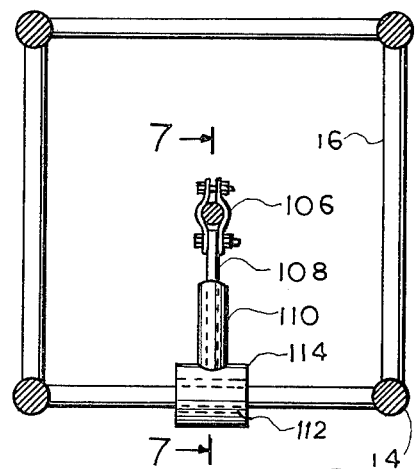
FIG. 6 is a partially sectional top view of a sleeve for preventing the vibration of the pumping rod.
Figure 7:
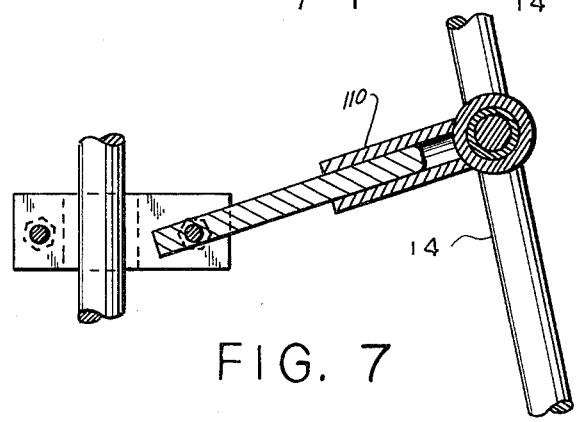
FIG. 7 is a sectional view taken along a plane of line 7—7 of FIG. 6.

An alternative pump rod guide means is shown in FIGS. 6 and 7. A second support member or clamp 106 is fixedly secured to the pumping rod 26. A guide rod 108 is pivotably secured to the clamp at one end and telescoped within a pipe 110 at its other end. The pipe 110 is pivotably secured to one of the horizontal support beams 16 of the tower. A bearing 112 is provided between the support beam 16 and the pivotable support member 114 to which the pipe 110 is attached.

An alternative counterbalancing mechanism is illustrated in FIG. 8. A block 116 having a pair of U-bolts 118 is rigidly attached to the pumping rod 26. Pivotable members 120, 122 are secured to beams 16 in a similar manner to members 80, 82 described above. Weights 124, 126 are attached to rods 128, 130 extending outwardly from the pivotable members. A pair of rods 132, 134 extend inwardly of the tower from the pivotable members 120, 122. Chains 136, 138 or other flexible connecting means are secured between the U-bolts on the block 116 and eye holes 140, 142 near the ends of the rods 128, 130.

Due to the provision of counterbalancing systems within the windmill, the pumping operation is significantly improved. Referring to FIG. 3, when the pumping rod 26 is at the lowest point of its stroke, the counterbalancing weights 92, 94 are at the highest point of the arc along which they swing. The beam 16 along which pivoting occurs may be considered a fulcrum between the forces exerted by the weights and pumping rod. The weights accordingly urge the pumping rod upwards when the rod is in its lowest position. When the pumping rod is at its highest point (as shown in phantom in FIG. 3), it exerts a force which tends to urge the weights upwardly. The position and magnitude of the weights are arranged so there is no moment about the fulcrum. Smooth rotation of the rotor in the wind is accordingly provided as the force necessary to move the pumping rod is substantially the same no matter where it is temporarily positioned.

As the pumping rod moves up and down and as the weights swing through their arcs, the pivotable members and bearings within the system minimize friction. They also permit a simplified operation with durable components which are easy to install or replace. Movement of the pumping rod 26 causes pivotable members 60, 62 to rotate within bearings 68, 70. Rods 72, 74 simultaneously slide back and forth within bearings 76, 78 as pivotable members 80, 82 move about the axes of beams 16. Vibration of the pumping rod is prevented by the collar 96 shown in FIG. 3 or the arrangement shown in FIGS. 6-7.

The counterbalancing mechanism shown in FIG. 8 functions as weights 128, 130 pivot about beams 16. As the pumping rod moves down, the weights swing up due to the pulling of the chains 136, 138 on the rods 132, 134. It will therefor take less force to lift the pumping rod from its lowest position when the weights exert an upward force on the rod by means of the rods 132, 134 and chains.

An efficient and reliable pumping apparatus is thereby provided. Those skilled in the art will appreciate that modifications can be made in the invention without departing from the spirit thereof. The scope of the invention should accordingly be determined by reference to the following claims.

What is claimed is:

1. A windmill for pumping water from a well having a casing extending into the earth and a liquid column within said casing, comprising:
   a tower including a plurality of beams;
   a rotor mounted near the top of said tower and adapted for rotating in the presence of wind;
   a pumping rod extending into the casing of the well;
   means operatively connected between said rotor and said pumping rod for converting rotational movement of said rotor into reciprocal motion of said pumping rod, and
   counterbalancing means for counterbalancing the weight of said pumping rod and the weight of a liquid column within the well casing in which the pumping rod is adapted to reciprocate including a first support member rigidly secured to said pumping rod, first and second cores within said first support member; first and second pivotable members having, respectively, first and second cylindrically shaped portions extending within said cores, respectively, and pivotable therein, and first and second bores substantially perpendicular to said cylindrically shaped portions; first and second rods having portions thereof slidably positioned, respectively, within said bores; third and fourth pivotable members pivotably secured, respectively, to horizontal beams on opposite sides of said tower, said first and second rods having end portions fixedly secured, respectively, to said third and fourth pivotable members; and counterbalancing weights fixedly secured to said third and fourth pivotable members, respectively, said weights adapted for counterbalancing the weight of said pumping rod and said liquid column.

2. A windmill as described in claim 1 wherein said counterbalancing weights are attached to third and fourth rods extending outwardly of said tower from said third and fourth pivotable members, respectively.

3. A windmill as described in claim 1 further including a collar surrounding said pumping rod, said collar being fixedly secured to said tower to minimize vibration of said pumping rod.

4. A windmill as described in claim 1 further including a second support member fixedly attached to said pumping rod, a guide rod pivotably secured to said second support member and having an end telescoped within a pipe; and said pipe being pivotably secured to a horizontal beam of said tower.

5. A windmill as described in claim 1 wherein bearings are provided between said cylindrically shaped portions of said first and second pivotable members and said first support member, said first and second pivotable members and said first and second rods, and said third and fourth pivotable members and said horizontal beams, respectively.

6. A windmill comprising;
   a tower including a plurality of beams;
   a rotor mounted near the top of said tower and adapted for rotating in the presence of wind;
   a pumping rod;
   means operatively connected between said rotor and said pumping rod for converting rotational movement of said rotor into reciprocal motion of said pumping rod, and
   counterbalancing means including a first support member rigidly secured to said pumping rod, first and second cores within said first support member; first and second pivotable members having, respectively, first and second cylindrically shaped portions extending within said cores, respectively, and pivotable therein, and first and second bores substantially perpendicular to said cylindrically shaped portions; first and second rods having portions thereof slidably positioned, respectively, within said bores; third and fourth pivotable members pivotably secured, respectively, to horizontal beams on opposite sides of said tower, said first and second rods having end portions fixedly secured, respectively, to said third and fourth pivotable members; and counterbalancing weights fixedly secured to said third and fourth pivotable members, respectively.

7. A windmill as described in claim 6 wherein said counterbalancing weights are attached to third and fourth rods extending outwardly of said tower from said third and fourth pivotable members, respectively.

8. A windmill as described in claim 6 further including a collar surrounding said pumping rod, said collar being fixedly secured to said tower to minimize vibration of said pumping rod.

9. A windmill as described in claim 6 further including a second support member fixedly attached to said pumping rod, a guide rod pivotably secured to said second support member and having an end telescoped within a pipe; and said pipe being pivotably secured to a horizontal beam of said tower.

10. A windmill as described in claim 6 wherein bearings are provided between said cylindrically shaped portions of said first and second pivotable member and said first support member, said first and second pivotable members and said first and second rods, and said third and fourth pivotable members and said horizontal beams, respectively.

11. A windmill comprising:
    a tower including a plurality of beams;

a rotor mounted near the top of said tower and adapted for rotating in the presence of wind;

a pumping rod;

means operatively connected between said rotor and said pumping rod for converting rotational movement of said rotor into reciprocal motion of said pumping rod;

counterbalancing means including a first support member fixedly secured to said pumping rod; first and second pivotable members pivotably secured to horizontal beams on opposite sides of said tower; first and second rods secured to said first and second pivotable members, respectively; first and second flexible connecting means connecting said first support member with said first and second rods at a distance from said horizontal beams; and counterbalancing weights secured to said first and second pivotable members, respectively, and a second support member fixedly attached to said pumping rods, a guide rod pivotably secured to said second support member and having an end telescoped within a pipe, said pipe being pivotably secured to a horizontal beam of said tower.

12. A windmill as described in claim 11 wherein said counterbalancing weights are attached to third and fourth rods extending outwardly of said tower from said first and second pivotable members, respectively.

13. A windmill as described in claim 11 further including a collar surrounding said pumping rod, said collar being fixedly secured to said tower to minimize vibration of said pumping rod.

14. A windmill as described in claim 11 wherein bearings are provided between said first and second pivotable members, respectively, and said horizontal beams.

* * * * *